United States Patent
Mastrangelo et al.

(10) Patent No.: US 6,219,804 B1
(45) Date of Patent: Apr. 17, 2001

(54) DEBUGGING CLIENT SERVER PROGRAMS FROM THIRD PARTY WORKSTATIONS

(75) Inventors: Colette A. Mastrangelo, Fishkill; Richard W. Potts, Jr., Poughquag, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,555

(22) Filed: Aug. 5, 1998

(51) Int. Cl.⁷ .................................................... G06F 11/00
(52) U.S. Cl. ................................ 714/38; 709/203; 714/37
(58) Field of Search ......................... 714/38, 37; 709/203

(56) References Cited

U.S. PATENT DOCUMENTS

| | | |
|---|---|---|
| 5,325,530 | 6/1994 | Mohrmann . |
| 5,371,746 * | 12/1994 | Yamashita et al. ............ 714/38 |
| 5,561,763 * | 10/1996 | Eto et al. ..................... 714/35 |
| 5,612,898 | 3/1997 | Huckins . |
| 5,615,331 | 3/1997 | Toorians et al. . |
| 5,630,049 | 5/1997 | Cardoza et al. . |
| 5,819,093 * | 10/1998 | Davidson et al. ............. 395/704 |
| 5,918,004 * | 6/1999 | Anderson et al. ............. 714/38 |
| 6,003,143 * | 12/1999 | Kim et al. ................... 714/38 |
| 6,058,393 * | 5/2000 | Meier et al. .................. 707/10 |
| 6,060,518 * | 5/2000 | Kabanov et al. .............. 514/781 |
| 6,119,247 * | 9/2000 | House et al. .................. 714/38 |

FOREIGN PATENT DOCUMENTS

| | | |
|---|---|---|
| 0 690 378 A1 | 1/1996 | (EP) . |
| 0 730 227 A1 | 9/1996 | (EP) . |
| 5-274177 | 10/1993 | (JP) .................. G06F/11/28 |
| 7-306800 | 11/1995 | (JP) . |

OTHER PUBLICATIONS

Evans et al., "Method of Remote Debugging for OS2/2.2 Type of Software," IBM Technical Disclosure Bulletin vol. 37, No. 06B, Jun., 1994, pp. 65–68.

R.R. Heisch, "Profile Based Optimization for Embedded Controller Environments," IBM Technical Disclosure Bulletin, vol. 39, No. 09, Sep., 1996, p. 69.

"Remote System Debug Over the Internet," IBM Technical Disclosure Bulletin, vol. 39, No. 11, Nov. 1996, pp. 11–12.

* cited by examiner

*Primary Examiner*—Ly V. Hua
(74) *Attorney, Agent, or Firm*—Andrew J. Wojnicki, Jr.; Lily Neff

(57) ABSTRACT

A computer program device and a computer program product are introduced comprising a computer storage debugging device readable by a digital processing apparatus; and a debugging program means is introduced. The debugging program means is to be used with the program storage device and includes instructions executable by the digital processing apparatus for performing method steps for debugging a particular transaction in a computer network environment, where the environment includes a plurality of clients in processing communication with one another. The method steps comprise: identifying at least one client present in said environment and storing pertinent information about any identified clients; providing information about whether or not a particular session needs to be debugged; and determining if a particular session needs debugging so that debugging operation can be started accordingly.

18 Claims, 2 Drawing Sheets

DEBUGGING CLIENT SERVER PROGRAMS FROM THIRD PARTY WORKSTATIONS

FIELD OF INVENTION

The present invention relates to a method of providing debugging operations in a complex computing network environment.

BACKGROUND OF THE INVENTION

The complex computing network environments of today connect a multitude of mini computing sub-environments to one another. These sub-environments can include several main frame computers as well as many smaller and less sophisticated workstations. Each computing component of the environment is considered to be a distinct client. One example of such network environment is the internet where many different users and servers come together and share data and exchange information.

In such complex environments many applications are running concurrently and similar commands are being processed on different clients at the same time. Unfortunately, however, when a processing problem is encountered, it has become a challenge to identify and debug the particular application or client that is having the problem. Even when problems do not occur, it may be desirable to debug a particular application for a variety of reasons. The challenge lies in identifying the particular application as well as the client, server, server session, and appropriate communication protocol. Many clients can run the same identical application, but it is often the case that only one of these clients will encounter a problem. Determining which client and which application are experiencing the problem is a complicated and time consuming task.

As a consequence, it is desirable to develop a system and method of debugging clients and applications in a complex networking environment by identifying the particular application and/or client that requires the debugging operation.

This application is being filed on the same date as related application, attorney dockets PO9-98-104 and PO9-98-105.

SUMMARY OF THE INVENTION

In one embodiment of the present invention a computer program device comprising a computer storage debugging device readable by a digital processing apparatus; and a debugging program means is introduced. The debugging program means is to be used with the program storage device and includes instructions executable by the digital processing apparatus for performing method steps for debugging a particular transaction in a computer network environment, where the environment includes a plurality of clients in processing communication with one another. The method steps comprise: identifying at least one client present in said environment and storing pertinent information about any identified clients; providing information about whether or not a particular session needs to be debugged; and determining if a particular session needs debugging so that debugging operation can be started accordingly.

In another embodiment, a computer program product for debugging for use with a computer network environment having a plurality of clients each running applications is introduced. The computer program product comprises a data storage device used for debugging and including a computer usable medium having computer readable program means for identifying said debugging data storage device to said computing environment; computer readable code table means for storing pertinent information about the debugging data storage device; computer readable code for identifying and storing all clients present in the environment; and computer readable code means for identifying whether a client or an application needs to be debugged and performing the debugging when appropriate.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
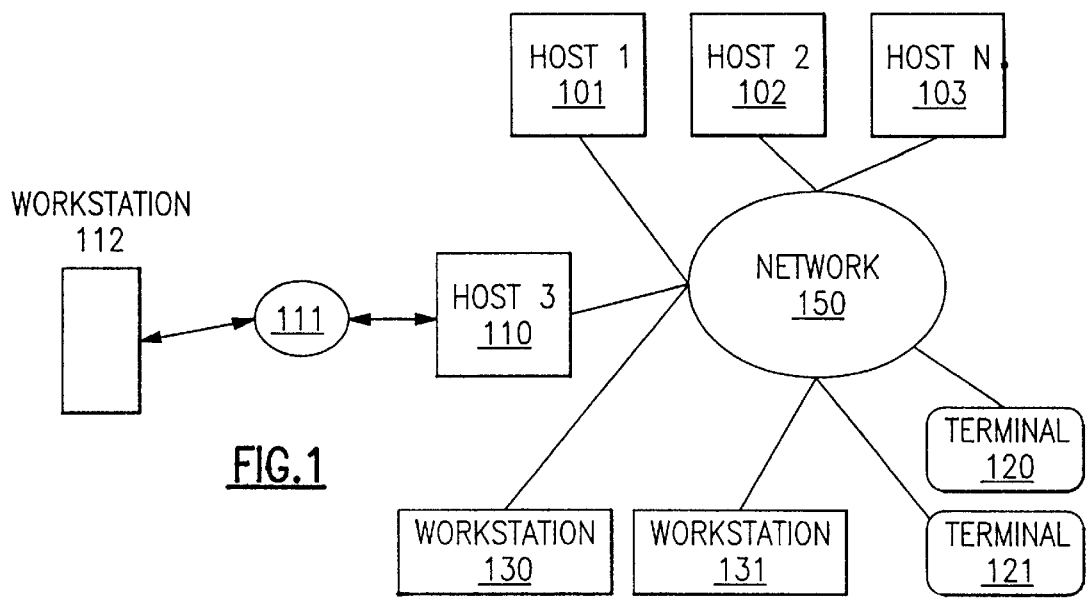
FIG. 1 is an illustration of a computing network system environment.

FIG. 1 illustrates a sample computing network system environment. A plurality of hosts 101, 102, 103 and 110 and a plurality of terminals 120, 121 and workstations 130, 131 are in processing communication with one another via a network shown at 150. As is shown in the FIG. 1, by way of example, any one of the clients such as the host shown at 110 can form a sub-environment by being further connected to other workstations, shown at 112 and LANs or local Area Networks, shown at 111.

Figure 2:
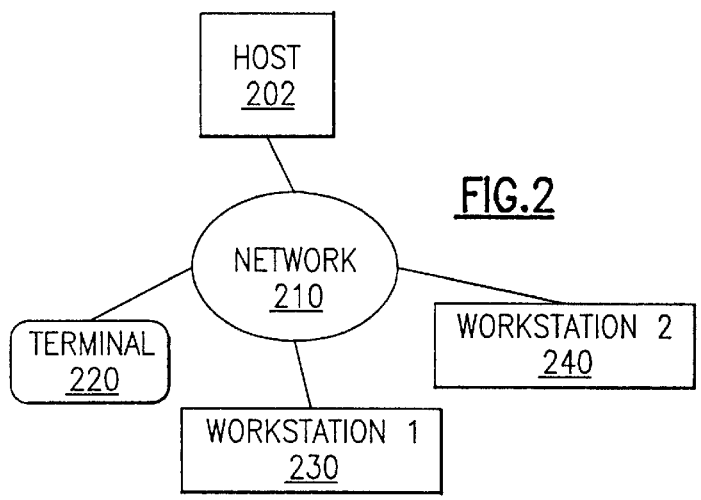
FIG. 2 is an illustration of a mini computing sub-environment.

FIG. 2 is an illustration of a computing sub-environment such as the one provided in FIG. 1 by host 110. The host in FIG. 2 is shown at 202. The host is in processing communication, via a network shown at 210, with a plurality of workstations shown at 230 and 240 respectively. The host in this example can be a mainframe computer.

When a multitude of clients are in processing communication with one another as shown in FIG. 1, a plurality of sessions are established using the network. On a mainframe computer such as the host of FIG. 2, one application can be processing thousands of requests each second. If only one application, request or sessions is experiencing a problem, it becomes desirable to only debug that particular application, request or session without interfering with the process of the entire environment or sub-environment. Even when there are no problems, it may become necessary to debug a particular application or client without affecting other clients and/or applications present in the environment.

Figure 3:
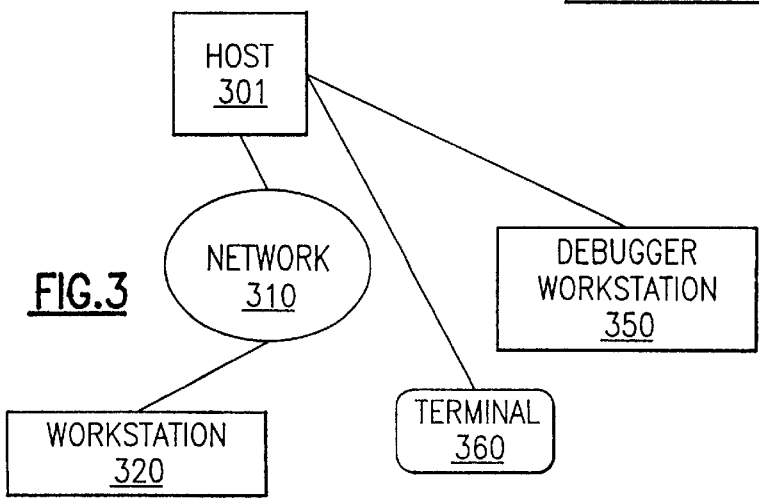
FIG. 3 is an illustration of one embodiment of the present invention utilizing a debug workstation.

FIG. 3 illustrates an embodiment of the present invention. The network shown at 310 connects a host at 301 to a plurality of terminals such as the one provided at 320. A debug workstation is connected directly to the host as shown at 350. The debug workstation and the host can also be in processing communication with another terminal as shown at 360. In an alternate embodiment (not shown), the debug workstation can be connected indirectly to the environment. For example, it can be connected to the host(s) via the network 310. The location or the manner of connection of the debug workstation to the rest of the computing environment is not of any particular importance and different processing arrangements can be made in alternate embodiments. While it is preferred that the debug mechanism be located on a separate workstation other than the client or server machine, it is even possible in some embodiments to have the debug mechanism as a part of the particular client or server machine.

The debug mechanism or workstation is identified to the system environment at any time. It can be registered to the environment initially when it is introduced to the environment or at any later time. In a preferred embodiment where a debug workstation is used, the workstation sends a trace entry to the host in order to identify itself. Nonetheless, there are many other ways that the debug workstation can be identified, for example by using the defined communication protocol. In another embodiment of the present invention where TCP/IP is the communication protocol utilized, a debug workstation and server are identified by their TCP/IP addresses.

Each client present in the computing environment is also identified and pertinent information about each client is stored in a debug table accessible by the debug mechanism. As it was the case before, each client can be identified to the environment at initialization time or later as the client joins the environment, or the client can register at any other point in time as a need arises or when debugging procedure is to be initiated on that client. At the same time, a client can also un-register at any point in time and in one embodiment pertinent data relating to that unregistered client is then removed from the debug table until the next time when the client re-registers again.

The information stored about each client not only will include the address of the client and the server used, but also the communication protocol utilized in establishing a particular session. It is even possible to define different protocols such TCP/IP, SNA, TPF LNIATA etc., for different sessions, each time also providing the correlated client terminal address.

Figure 4:
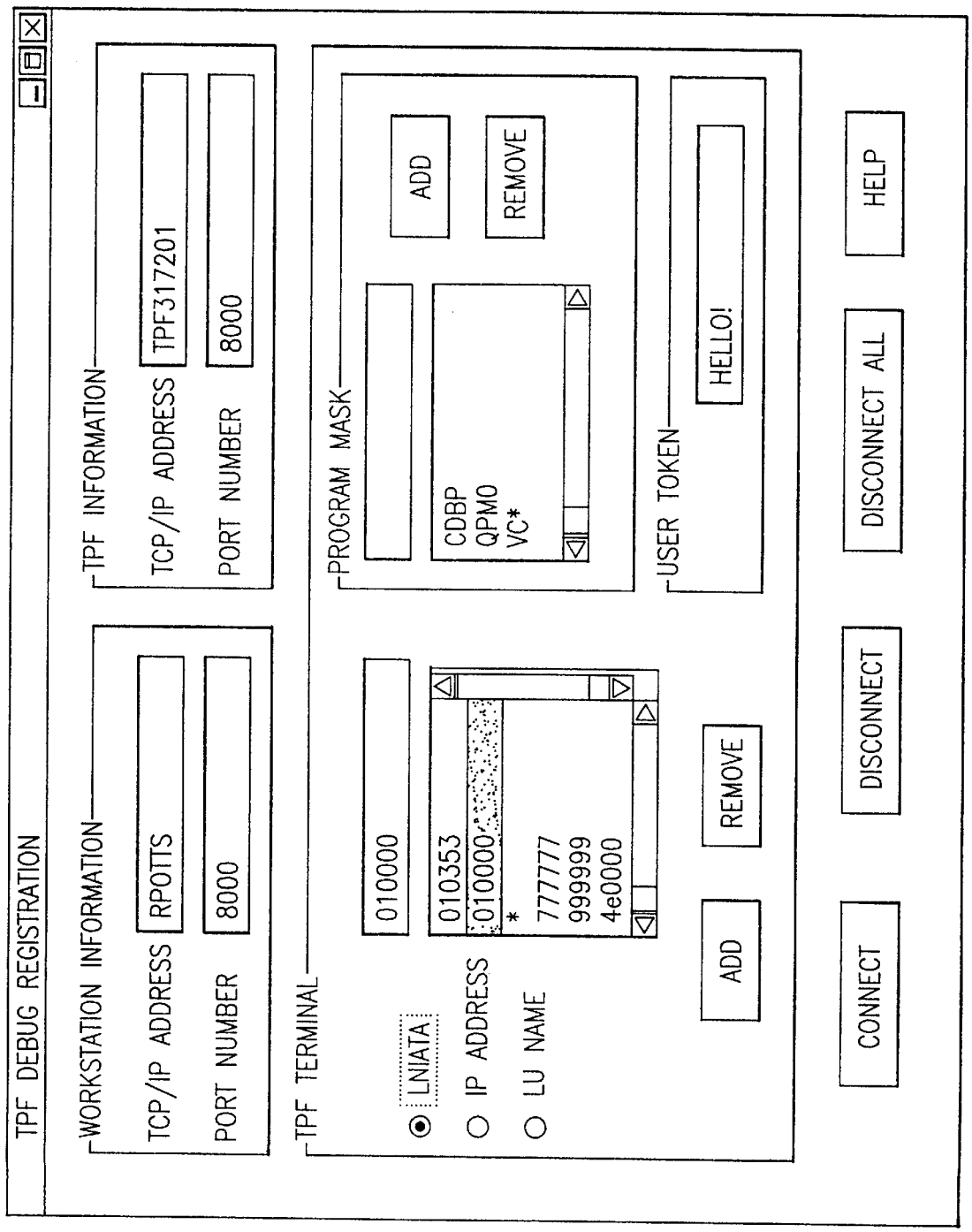
FIG. 4 is a sample of a debug screen as used with one embodiment of the present invention.

FIG. 4 is an illustration of a screen that may be provided at time of debugging mechanism's registration at initialization time. In the embodiment shown in FIG. 4, the screen includes such information as the TCP/IP address and Port number for the host and the workstation debugged as well as type of communication protocol used, information about any program masks or user tokens. (Although TCP/IP is used in this example, other communications besides TCP/IP are supported and can be used.)

When any application is started on a particular client (or all clients if desired), a debug table is set up for that application. The debug table, besides having information about the application itself, also retrieves information about the location and address of the client, server used and the communication protocol used for that client. The debug table can also include an option providing information pertaining to the desirability of performing a debug for a particular client or application. At the onset of any application, the debug table is searched to determine if the particular application needs to be debugged for the particular client server session. If the application needs to be debugged, the debugged is started on the workstation (or location) identified to run the debugged.

One of the benefits of using a separate debugging workstation is to provide the debug program and run it on terminals other than the one currently in use. When debugging is being performed at a separate location than the application (including both the client and the server), the client/user and server/host can continue performing other tasks while being unaware of the debugging/recovery efforts. In addition, the debug terminal can have display abilities, such as a graphical interface, that may not be available on the client or the server.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A computer program product for debugging for use with a computer network environment having a plurality of clients each running applications, comprising:

a data storage device used for debugging and including a computer usable medium having computer readable program means for identifying said debugging data storage device to said computing environment;

computer readable code table means for storing pertinent information about said debugging data storage device;

computer readable code identifying all clients present in said environment;

computer readable code means for storing pertinent information about any identified clients;

computer readable code means for identifying whether a client or an application needs to be debugged;

computer readable code means for determining means if a particular application running on a particular client needs debugging so that debugging operation can be started accordingly.

2. The computer program product of claim 1, wherein new clients can be added to said environment at any time further comprising computer readable code for adding said new client to storage where pertinent information about all clients are kept.

3. The computer program product of claim 1, wherein clients can be removed from said environment at any time further comprising computer readable code to remove said pertinent information about said removed client from storage.

4. The computer program product of claim 1, further comprising providing computer readable code used for generating debugging screens on a graphical interface included in said network.

5. The computer program product of claim 1, further comprising computer readable code for displaying information about the communication protocol used as well as information about program masks and user tokens on said screen.

6. The computer program product of claim 1, further comprising computer readable code for providing client and debugging mechanism's address and port number on said screen.

7. The computer program product of claim 1, wherein TCP/IP communication protocol is used.

8. The computer program product of claim 7, further comprising computer readable code for identifying said client(s) by their TCP/IP addresses.

9. The computer program product of claim 1, wherein SNA communication protocol is used.

10. A computer program device comprising:

a computer storage debugging device readable by a digital processing apparatus; and a debugging program means on said program storage device and including instructions executable by said digital processing apparatus for performing method steps for debugging a particular transaction in a computer network environment, said environment having a plurality of clients in processing communication with one another, the method comprising the steps of:

identifying at least one client present in said environment and storing pertinent information about any identified clients;

providing information about whether or not a particular session needs to be debugged;

determining if a particular session needs debugging so that debugging operation can be started accordingly.

11. The computer program device of claim 10, wherein new clients can be added to said environment at any time further comprising computer readable code for adding said new client to storage where pertinent information about all clients are kept.

12. The computer program device of claim 10, wherein clients can be removed from said environment at any time further comprising computer readable code to remove said pertinent information about said removed client from storage.

13. The computer program device of claim 10, further comprising providing computer readable code used for generating debugging screens on a graphical interface included in said network.

14. The computer program device of claim 10, further comprising computer readable code for displaying information about the communication protocol used as well as information about program masks and user tokens on said screen.

15. The computer program device of claim 10, further comprising computer readable code for providing client and debugging mechanism's address and port number on said screen.

16. The computer program device of claim 10, wherein TCP/IP communication protocol is used.

17. The computer program device of claim 16, further comprising computer readable code for identifying said client(s) by their TCP/IP addresses.

18. The computer program device of claim 10, wherein SNA communication protocol is used.

* * * * *